United States Patent [19]
Okutsu et al.

[11] Patent Number: 5,676,354
[45] Date of Patent: Oct. 14, 1997

[54] SHEET FILM PACK

[75] Inventors: Taro Okutsu; Katsumasa Okada; Masafumi Fukugawa; Yoshio Hara, all of Kanagawa, Japan

[73] Assignee: Fuji Photo Film Co., Ltd., Kanagawa, Japan

[21] Appl. No.: 679,711

[22] Filed: Jul. 12, 1996

[30] Foreign Application Priority Data

Jul. 14, 1995 [JP] Japan .................. 7-178813
Jul. 14, 1995 [JP] Japan .................. 7-201598

[51] Int. Cl.⁶ ............................................ F16F 1/18
[52] U.S. Cl. ..................... 267/158; 267/164; 267/180
[58] Field of Search .......................... 267/158, 159, 267/160, 161, 162, 163, 164, 165, 180

[56] References Cited

U.S. PATENT DOCUMENTS

| | | | |
|---|---|---|---|
| 2,639,139 | 5/1953 | Carlson | 267/158 |
| 2,772,086 | 11/1956 | Foster | 267/158 |
| 2,820,625 | 1/1958 | Davis | 267/158 |
| 2,866,648 | 12/1958 | Parsons | 267/163 |
| 2,876,891 | 3/1959 | Long et al. | 267/158 |
| 3,059,500 | 10/1962 | Schneiter | 267/158 |
| 3,207,546 | 9/1965 | Ernest | 267/158 |
| 4,269,400 | 5/1981 | Jensen | 267/163 |
| 4,693,027 | 9/1987 | Wolff, Sr. et al. | 267/158 |
| 4,761,701 | 8/1988 | Oishi | 267/158 |
| 4,883,261 | 11/1989 | Zamitter | 267/158 |
| 4,909,275 | 3/1990 | Massey et al. | 267/158 |
| 5,094,434 | 3/1992 | Ryu | 267/158 |
| 5,106,586 | 4/1992 | Muszak et al. | 267/158 |
| 5,116,699 | 5/1992 | Miyajima | 267/160 |
| 5,199,554 | 4/1993 | Kano et al. | 267/158 |
| 5,213,314 | 5/1993 | Kano et al. | 267/163 |
| 5,226,634 | 7/1993 | Rudy, Jr. et al. | 267/158 |
| 5,448,324 | 9/1995 | Okano et al. | 354/277 |

FOREIGN PATENT DOCUMENTS

| | | | |
|---|---|---|---|
| 2-93135 | 4/1990 | Japan | 267/158 |
| 0979750 | 12/1982 | U.S.S.R. | 267/158 |

*Primary Examiner*—Douglas C. Butler
*Attorney, Agent, or Firm*—Sughrue, Mion, Zinn, Macpeak & Seas, PLLC

[57] ABSTRACT

A sheet film pack has a pack housing containing a plurality of sheet film units in a stack therein, a lid slidable relative to the pack housing to open or close an open top of the pack housing, and a plate spring mounted on an inner bottom surface of the pack housing to urge the stack of sheet film units toward the open top. Each sheet film unit consists of a sheet of photographic film and a plastic film sheath backing and fringing the sheet film. The plate spring has a pair of arched arms which extend parallel to each other along side zones of a bottom one of the sheet film units, such that peak areas of the arms contact the bottom sheet film unit at positions within 15 mm from side edges of the sheet film unit.

4 Claims, 20 Drawing Sheets

FIG. 17

| PHYSICAL PROPERTIES | MEASURING METHOD | TEMPERATURE | PHYSICAL VALUE |
|---|---|---|---|
| TENSILE STRENGTH | ASTM-D638 | -55℃<br>23℃<br>70℃ | 70~130 MPa<br>50~ 90 MPa<br>35~ 60 MPa |
| STRAIN UNDER TENSION | ASTM-D638 | -55℃<br>23℃<br>70℃ | 7~ 13%<br>20~ 30%<br>50~180% |
| MODULUS IN FLEXURE | ASTM-D638 | -55℃<br>23℃<br>70℃ | 3320~6160 MPa<br>2250~4190 MPa<br>1210~2260 MPa |
| IZOD IMPACT STRENGTH | ASTM-D256 (WITH NOTCH) | 23℃ | 45~ 80 J/m |
| MFI | JISK-7210 | 190℃ | 3~ 5g/10min |

FIG. 18

| PORTIONS OF SPRING ARM | STRESS |
|---|---|
| ROOT 102ac | 77kgf/cm² (7.6MPa) |
| MIDDLE POSITION 102aa OF HORIZONTAL ARM PORTION 102a | 0.7kgf/cm² (0.07MPa) |
| CONNECTING POSITION 102ab | 102kgf/cm² (10.0MPa) |
| MIDDLE POSITION 102ba OF CURVED PORTION 102b | 147kgf/cm² (14.4MPa) |
| CONNECTING POSITION 102cb | 128kgf/cm² (12.6MPa) |
| DISTAL CONNECTING POSITION 102ca OF FORE ARM PORTION 102c | 14kgf/cm² (1.4MPa) |

FIG. 19

| PORTIONS OF SPRING ARM | STRESS |
|---|---|
| ROOT 102ac | 77kgf/cm² (7.6MPa) |
| MIDDLE POSITION 102aa OF HORIZONTAL ARM PORTION 102a | 33kgf/cm² (3.2MPa) |
| CONNECTING POSITION 102ab | 149kgf/cm² (14.6MPa) |
| MIDDLE POSITION 102ba OF CURVED PORTION 102b | 185kgf/cm² (18.1MPa) |
| CONNECTING POSITION 102cb | 163kgf/cm² (16.0MPa) |
| DISTAL CONNECTING POSITION 102ca OF FORE ARM PORTION 102c | 4kgf/cm² (0.4MPa) | though the present invention relates to a sheet film pack containing therein a plurality of sheet films stacked one atop another, and more particularly to a sheet film pack which is improved in creep resistance.

SHEET FILM PACK

BACKGROUND OF THE INVENTION

1. Field of the Invention

The present invention relates to a sheet film pack containing therein a plurality of sheet films stacked one atop another, and more particularly to a sheet film pack which is improved in creep resistance.

2. The Known Prior Art

A sheet film 4×5 inches or more in size is used in large format cameras, such as view cameras and studio cameras, for taking a photograph that is to be printed in a large size or at a large print magnification, and thus requires sharpness of the image.

In order to take photographs on a large number of sheet films in rapid succession through a single camera, a sheet film pack and a film pack holder are suggested in Japanese Laid-open Patent Application Nos. 5-341378 and 5-341379.

As shown in FIGS. 20 and 21, the sheet film pack 1 contains a plurality of, e.g., eight sheet film units 5 stacked one atop another in a pack housing 2. The sheet film unit 5 consists of a 4×5 inches sheet film 3 and a film sheath 4, as shown in FIG. 22. The film sheath 4 may be made of a plastic resin as an integral body having a backing plate 4a for backing the sheet film 3 and a fringe 4b holding three side margins of the sheet film 3. The sheet film 3 can be slid into the film sheath 4 along a channel formed between the backing plate 4a and the fringe 4b.

As shown in FIGS. 21 and 23, a plate spring 7 is mounted on an inner bottom surface 2a of the pack housing 2 to urge the stack of sheet film units 5 toward an open top 2b of the pack housing 2. A pair of guide rails 2c are formed along longitudinal side margins of the open top 2b, for guiding a sliding lid 9 to open and close the open top 2b of the pack housing 2. A grip 9a is formed on a leading end of the sliding lid 9, to facilitate the reciprocating operation of the sliding lid 9. A cap 11 is removably attached to a trailing end 2d of the pack housing 2. The cap 11 has a fastening member 12 and an L-shaped plate 13 for enclosing the fastening member 12 in the cap 11. The fastening member 12 is to fasten the cap 11 to the pack housing 2 to shield the interior of the pack housing 2 in a light-tight fashion, while locking the sliding lid 9 in the closed position through engagement in holes 9b and 9c of the lid 9.

The pack holder 10 is constituted of a holder housing or external frame 16, a sliding tray or internal frame 15 slidable in the holder housing 16, and a cover 14 hinged to the holder housing 16. The sheet film pack 1 is loaded in the sliding tray 15 with its top side oriented toward the cover 14, that is, toward a front of the pack holder 10 with respect to the camera to which the pack holder 10 is attached.

When the cover 14 is closed after the sheet film pack 1 is loaded in the pack holder 10, the fastening member 12 is resiliently depressed by the cover 14, thereby unlocking the sliding lid 9. When the sliding lid 9 is drawn out to a predetermined amount, a topmost one 5a of the stack of sheet film units 5 pops out through the open top 2b to an exposure position of the holder housing 16, because of the force of the plate spring 7. The exposure position is defined by an inner wall 14a of the cover 14. Thereafter, the sliding lid 9 is moved back to the closed position, thrusting into between the topmost sheet film unit 5a and the next sheet film unit 5b. Thus, the sheet film unit 5a is maintained flat in the exposure position. Four leaf springs 17 are mounted to the inner wall 14a of the cover 14 to urge the topmost sheet film 5a toward a bottom or back wall 10a of the pack holder 10.

Upon drawing out the sliding lid 9 again, after making an exposure on the sheet film 3 of the sheet film unit 5a, the sliding tray 15 is drawn from the holder housing 16 together with the sliding lid 9 and the pack housing 2, while the cap 11 and thus the exposed sheet film unit 5a, is left in the holder housing 16. Then, the leaf springs 17 push the exposed sheet film unit 5 down to the bottom wall 10a of the pack holder 10.

A partition wall 2e is disposed inside the trailing end 2d, for aligning the ends of the sheet film units 5 in the pack housing 2. And a recovery mouth 8 is provided between the partition wall 2e and the inner bottom surface 2a of the pack housing 2, for receiving the exposed sheet film unit 5a back into the pack housing 2. Specifically, as the pack housing 2 and the sliding tray 15 are moved back to the holder housing 16 by pushing the sliding lid 9 into the holder housing 16, the exposed sheet film unit 5a that is left in the holder housing 16 is inserted into the bottom of the stack of sheet film units 5 through the recovery mouth 8, by virtue of the leaf springs 17.

In this way, the sheet film units 5 in the pack housing 2 are placed in the exposure position, in turn responsive to the sequential reciprocating operation of the sliding lid 9.

The sheet film pack 1 further has a counter disc 21 for displaying the number of exposed sheet film units 5. The counter disc 21 is rotatably disposed in a cavity 20 formed in the pack housing 2 proximate to the leading end thereof, and is rotated by a not-shown counter advancing mechanism mounted in the pack holder 10, one step at each reciprocation of the sliding tray 15. A pressing member 22 is mounted in the cavity 20 with its stem portion guided along a vertical rail 20a of the cavity 20. An upper end 22a of an U-shaped spring arm of the pressing member 22 is always constrained by the under surface of the sliding lid 9, so that a lower end 22b of the stem portion of the pressing member 22 always contacts one of a plurality of claws 21a formed circumferentially on the counter disc 21, so as to prevent reversal of the disc rotation.

The claws 21a are associated with film number indices, and all but one are equal in height. The one that is higher than the other claws 21a and has a flat top surface, is associated with an end mark. Thereby, an upper end 22c of the stem portion of the pressing member 22 is maintained spaced a predetermined distance from the under surface of the sliding lid 9 during photographing. But when the final sheet film unit 5 has been exposed, the pressing member 22 moves upward to bring the upper end 22c into engagement with a hole 9f of the sliding lid 9, so as to secure the lid 9 to the closed position.

FIG. 24 shows the plate spring 7 used in the sheet film pack 1. The plate spring 7 has a pair of parallel arms 7a and 7b connected at their one ends through a base portion 7c. The arms 7a and 7b are arched relative to the bottom surface 2a of the film pack 2, as shown in FIGS. 21 and 23, so that the arms 7a and 7b support the sheet film unit 5 at peaks 19a and 19b of the arches. However, as shown by the section in FIG. 25, under the spring force of the arms 7a and 7b urging the stack of sheet film units 5 upward, the sheaths 4 of the sheet film units 5 are deflected because its stiffness is low in the middle portion of the backing plate 4a, compared with the side zones. The deflection can result in creep strain whose degree increases with the time. Therefore, if the sheet film units 5 are contained in the sheet film pack 2 for a long time, the sheet film units 5 won't be maintained flat, so that when the lid 9 is moved back between the topmost and next sheet film units 5a and 5b the sliding lid 9 can scratch the sheet film 3 of the next sheet film unit 5b.

The pressing member 22 for the counter disc 21 can suffer creep strain because it is kept depressed by the sliding lid 9 until all the sheet film units 5 contained in the sheet film pack 2 have been exposed. As a result of creep strain, the pressing member 22 would not sufficiently press the counter disc 21, so that the counter advancing operation could not be properly effected. The creep strain can occur especially in the bent portion of the U-shaped spring arm of the pressing member 22. On the other hand, it is desirable to form the pressing member from a plastic resin because it is cheaper than steel.

OBJECT OF THE INVENTION

In view of the foregoing, an object of the present invention is to provide a sheet film pack which prevents sheet film units from suffering creep strain even when they are stacked up for a long time on a plate spring in a pack housing.

Another object of the present invention is to provide a creep resistant pressing member at a low cost, which is kept being compressed for a long time in the sheet film pack.

SUMMARY OF THE INVENTION

In a sheet film pack which has a pack housing containing a plurality of sheet film units in a stack therein, a lid slidable relative to the pack housing to open or close an open top of the pack housing, and a plate spring mounted on an inner bottom surface of the pack housing to urge the stack of sheet film units toward the open top, and in which each sheet film unit consists of a sheet of photographic film and a film sheath backing and fringing the sheet film, the invention makes the plate spring have a pair of arched arms which extend parallel to each other along side zones of a bottom one of the sheet film units, such that peak areas of the arms contact the bottom sheet film unit at positions within 15 mm from side edges of the bottom sheet film unit.

Because stiffness of the film sheath and thus the sheet film unit is relatively large in the side zones, especially within 15 mm from the side edges thereof, deflection of the sheet film units supported on the plate spring is minimized, so that the creep-strain of the film sheath is prevented.

According to a preferred embodiment, the peak areas have a smaller width than other portions of the arms, and the width of the peak areas is preferably from 3 mm to 15 mm. It is preferable to provide the peak areas with protrusions protruding upward from upper surfaces of the arms.

If the sheet film pack has a counter disc held in a cavity of the pack housing so as to be rotated stepwise by an external counter advancing mechanism to indicate the number of sheet film units exposed in the sheet film pack, and a pressing member is mounted on the counter disc in the cavity with a spring arm compressed in a vertical direction to apply a pressure to the counter disc, wherein the spring arm extends from a vertical side of a stem portion and has a curved portion and a free distal end, the present invention makes the spring arm have different cross-sectional areas in different portions thereof so that a substantially equal stress may set up in the different portions of the spring arm under the compressed condition. According to a preferred embodiment, the curved portion has a larger cross-sectional area than other portions of the spring arm.

Dispersing the stress over the spring arm is effective to prevent the creep-strain of the spring arm that can occur especially in the curved portion.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 17 is a table showing preferable physical properties of the pressing member;

FIG. 18 is a table showing stress values at different positions of the spring arm when compressed 7.7 mm in a vertical direction;

FIG. 19 is a table showing stress values at corresponding positions of a comparative spring arm having a constant cross-sectional area, when compressed 7.7 mm in a vertical direction;

DETAILED DESCRIPTION OF THE PREFERRED EMBODIMENTS

Figure 1:
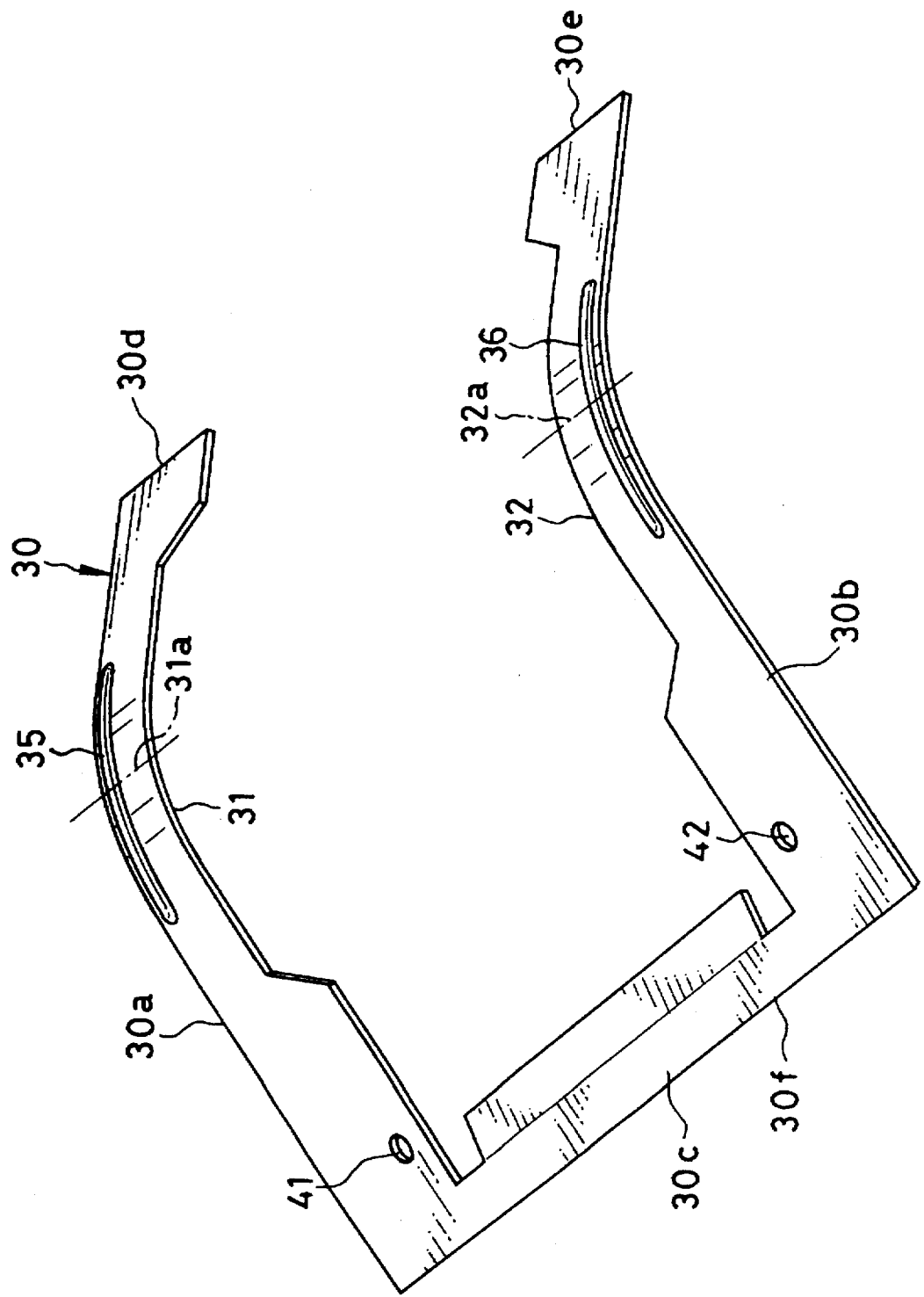
FIG. 1 is a perspective view of a plate spring for use in a sheet film pack according to an embodiment of the invention.
Figure 2:
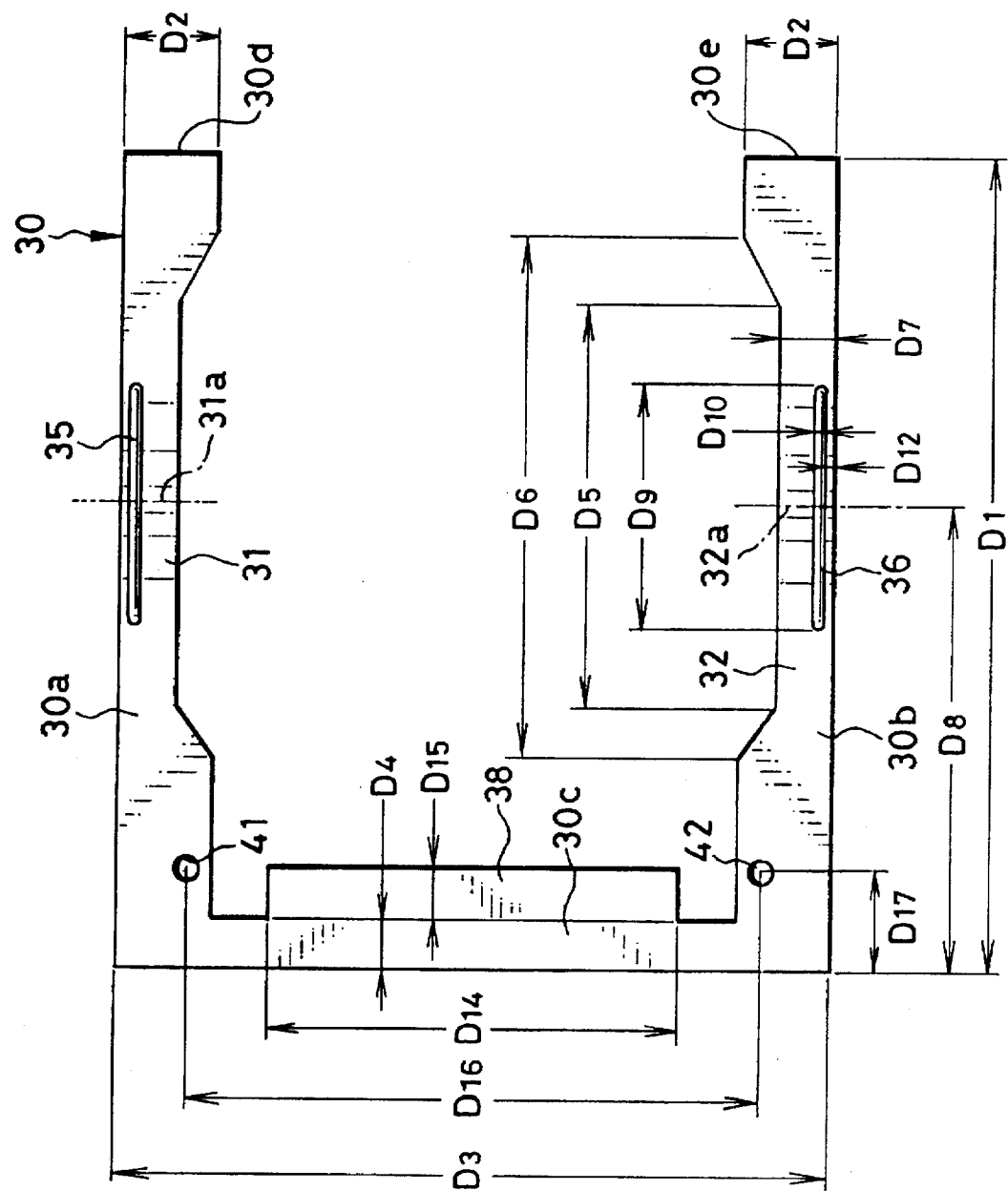
FIG. 2 is a top plan view of the plate spring shown in FIG. 1, illustrating the dimensions thereof.

FIGS. 1 and 2 show a plate spring 30 for use in a sheet film pack according to an embodiment of the present invention. Because the fundamental configurations of the sheet film pack may be equivalent to the sheet film pack shown in FIGS. 20 to 23, the following description is limited to those parts essential to the present invention, while the same or like parts are designated by the same reference numerals as in FIGS. 20 to 23.

The plate spring 30 has a pair of parallel arms 30a and 30b which are connected at their one ends through a base portion 30c. The plate spring 30 is blanked out as an integral body from a stainless steel spring plate of 0.2 mm thick, e.g. "SUS 304 CSP". For example, an entire length D1 and a maximum width D2 of the arms 30a and 30b are 121 mm and 13.5 mm, respectively. The base portion 30c has a length D3 of 104 mm and a width D4 of 7.5 mm. The arms 30a and 30b have trapezoidal cutaways along inside edges thereof so as to have a smaller width D7, e.g. 8 mm in intermediate portions 31 and 32 thereof, compared with the width D2. Shorter and longer sides of the trapezoidal cutaway have length D5 and D6 of 60 mm and 78 mm, respectively. The arms 30a and 30b are curved along the intermediate portions 31 and 32 to arch relative to an inner bottom surface 2a of a pack housing 2.

On the other hand, the stiffness of the film sheath 4 is higher in side zones within 15 mm from side edges 4c and 4d thereof, than the remaining middle portion, if any pressure is applied to the side zones, and the film sheath 4 can be hard to deform. Since the arms 30a and 30b get into contact with the sheet film unit 5 at peaks 31a and 32a of their narrower intermediate portions 31 and 32, the urging force of the plate spring 30 is applied only to the side zones within 15 mm from the side edges 4c and 4d of the film sheath 4 of the sheet film unit 5. Accordingly, the plate spring 30 is effective to prevent deflection and creep strain of the film sheath 4. According to this embodiment, a distance D8 from the peaks 31a and 32a to an outer end 30f of the base portion 30c is 69 mm.

Figure 3:
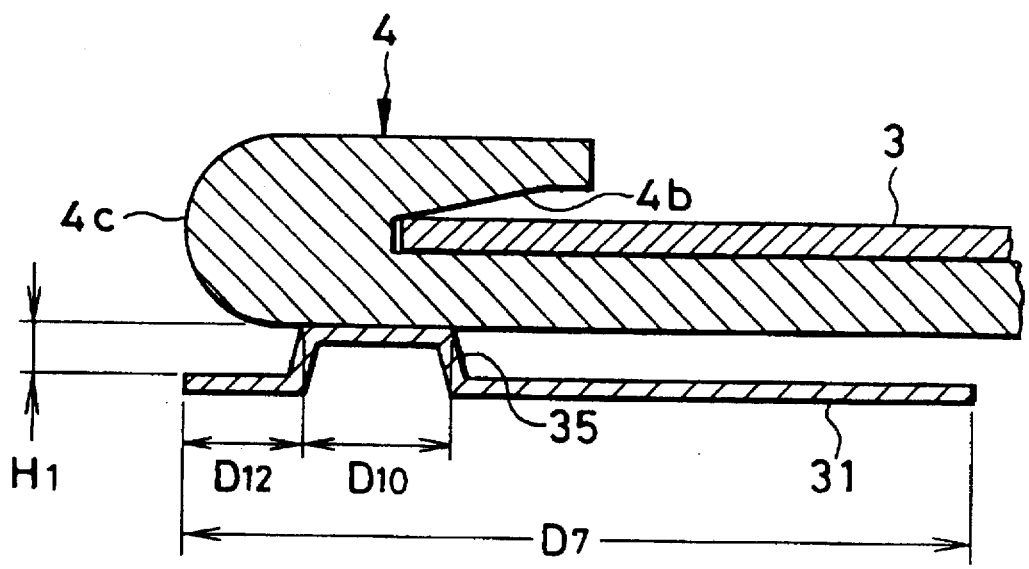
FIG. 3 is a fragmentary sectional view illustrating an arched arm of the plate spring and a sheet film unit supported thereon, taken along a peak of the arm.
Figure 8A:
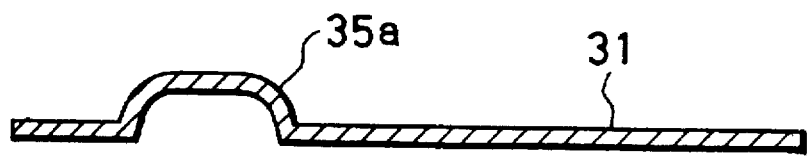
FIGS. 8A, 8B, 8C and 8D are sectional views illustrating possible variations in sectional contour of the protrusions.
Figure 8B:
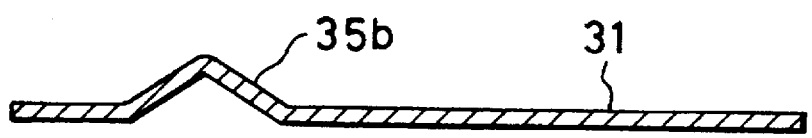
Figure 8C:
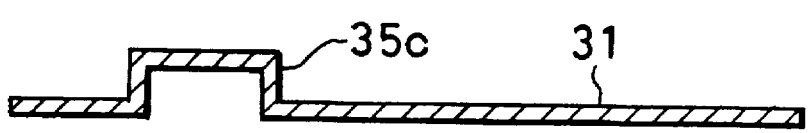
Figure 8D:
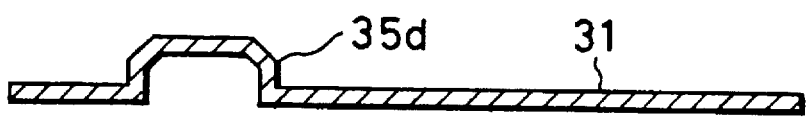

In addition, a longitudinal ridge 35 or 36 is formed along an outer side edge of either of the intermediate portions 31 and 32. The ridges 35 and 36 has a length D9 of 36 mm and a width D10 of 1.5 mm, and is spaced by a distance D12 of 1.2 mm from the outer edge of each arm 30a or 30b. As shown in FIG. 3, the ridges 35 and 36 have a height H1 of 0.5 mm. For example, the ridges 35 and 36 are formed by deep drawing to have a trapezoidal section, as shown in FIG. 3. Since the ridges 35 and 36 are formed along and proximate the outer side edges of the arms 30a and 30b in peak areas around the peaks 31a and 32a, the plate spring 30 pushes up the sheet film unit 5 at the stiffest portions of the sheet film unit 5 near when the side edges 4c and 4d are formed. Thus, deflection of the sheet film units 5 are almost completely prevented.

Figure 4:
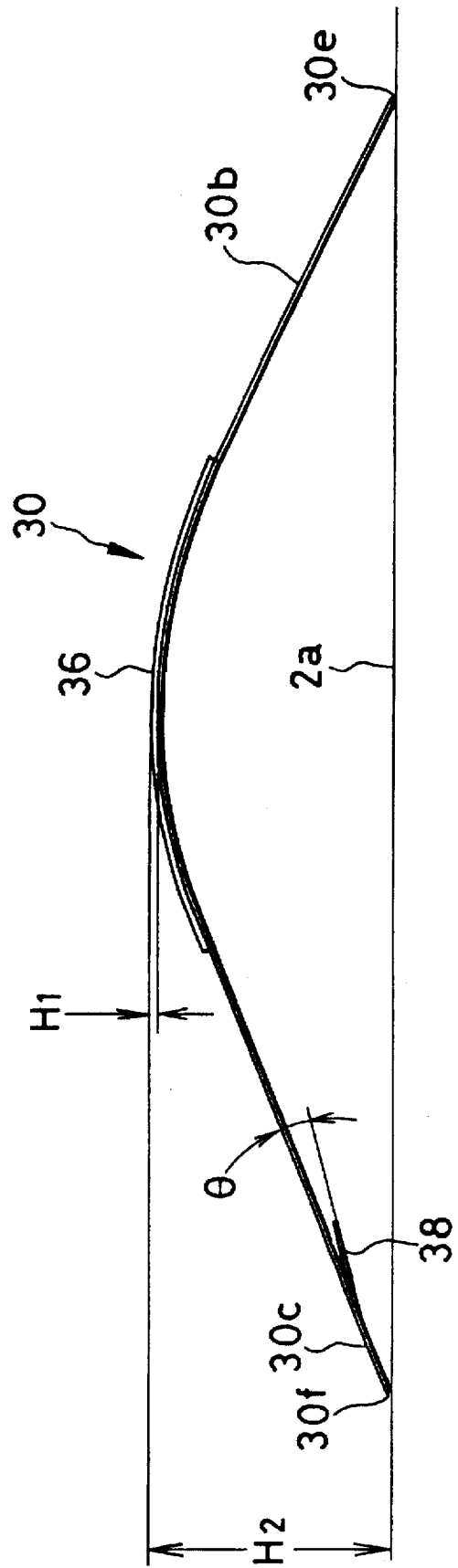
FIG. 4 is an explanatory side view of the plate spring.

As shown in FIG. 4, when no load is applied to the plate spring 30, a height H2 from the bottom surface 2a of the pack housing 2 to the peak 31a or 32a of each arm 30a and 30b, inclusive of the height of the ridge 35 or 36, is 19 mm in this embodiment. The plate spring 30 further has a supporting member 38 formed to protrude inwardly from the base portion 30c. The protrusion 38 has a length D14 of 60 mm and a width D15 of 7.5 mm. The protrusion 38 is bent to incline toward the bottom surface 2b by an angle θ, e.g. 4°, relative to the base portion 30c. When the plate spring 30 is depressed, the protrusion 38 is brought into contact with the bottom surface 2b, and bears the load on the plate spring 30 in cooperation with free ends 30d and 30e of the arms 30a and 30b, so that the outer end 30f of the base portion 30c is prevented from moving off the bottom surface 2b that may otherwise be caused by a compression-deflection of the plate spring 30.

Figure 5:
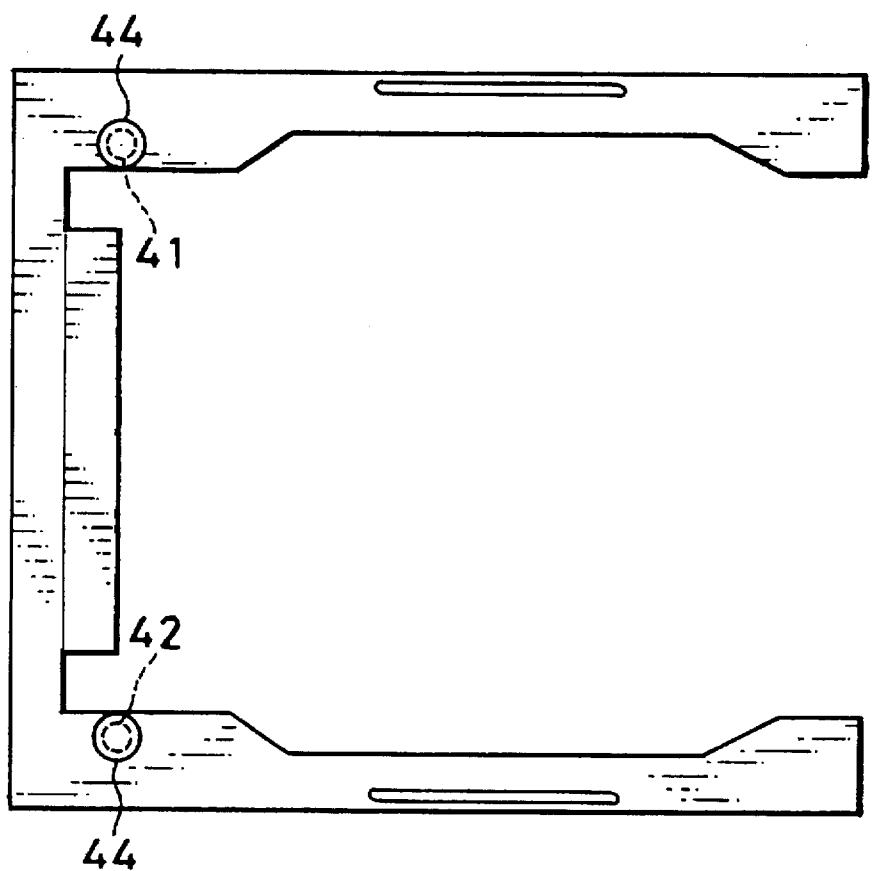
FIG. 5 is a top plan view of the plate spring secured to a pack housing by caulking.
Figure 6:
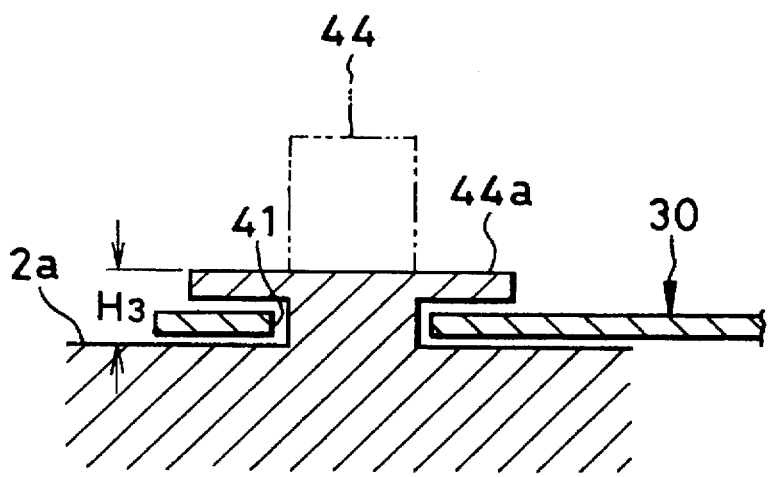
FIG. 6 is a vertical sectional view illustrating the caulked portion of the plate spring.

A hole 41 or 42 is formed through the end portion of each arm 31a or 30b that is closer to the base portion 30c. According to this embodiment, the holes 41 and 42 are spaced a distance D16 of 84 mm from each other and a distance D17 of 15 mm from the outer end 30f of the base portion 30c. As shown in FIGS. 5 and 6, the holes 41 and 42 are fitted on a pair of bosses 44 which are formed on the bottom surface 2a of the pack housing 2. Thereafter, the bosses 44 are melted to secure the plate spring 30 to the bottom surface 2a by caulking. In this way, the plate spring 30 is positioned exactly on the bottom surface 2a without any play. After the caulking, a height H3 of a top surface 44a of the boss 44f relative to the bottom surface 2a of the pack housing 2 should be so low as not to hinder the sheet film unit 5 that is moving back to the pack housing 2 through a recovery mouth 8 after the exposure.

Spring force of the arms 30a and 30b of the plate spring 30 is 100 g to 600 g, preferably 200 g to 400 g. Where the spring force is less than 100 g, the topmost sheet film unit 5a cannot reliably pop out of the pack housing 2. Moreover, tightness between the sliding lid 9 and the pack housing 2, namely between the sliding lid 9 and the guide rails 2c in the closed position is insufficient so that the sliding lid 9 cannot reliably shield the interior of the pack housing 2 from ambient light. Where the plate spring 30 has a spring force of more than 600 g, the sheet film units 5 are apt to deflect, and friction between the under surface of the sliding lid 9 and the topmost sheet film unit 5a is too large for smooth reciprocating operation of the sliding lid 9.

Test data for proving the advantages of the present invention will be set forth below.

Table 1 shows the degree of deflection of the film sheath 4 detected while changing contacting positions of the arms 30a and 30b of the plate spring 30 with the film sheath 4, concretely the distance of each contacting position from the side edge 4c or 4d of the film sheath 4. In Table 1, characters "A", "B", "C", "D" and "E" represent the degrees of prevention against deflection: "A" represents very good, "B" good, "C" tolerable for practical use, "D" necessary to improve, and "E" intolerable for practical use.

TABLE 1

| CONTACT POSITION | DEFLECTION |
| --- | --- |
| 1 mm | A |
| 2 mm | A |
| 3 mm | A |
| 5 mm | B |
| 10 mm | B |
| 15 mm | C |
| 20 mm | D |
| 25 mm | E |

Figure 25:
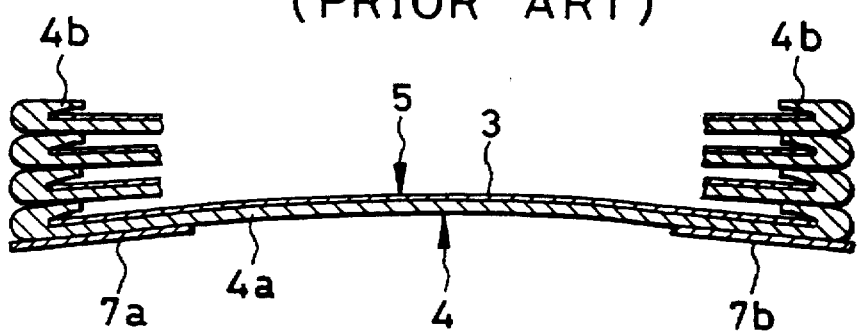
FIG. 25 is a sectional view illustrating deflection of the sheet film units supported on the prior art plate spring.

The results in Table 1 show that the contacting positions of the arms 30a and 30b with the film sheath 4 should be disposed within 15 mm from the side edges 4c and 4d of the film sheath 4, respectively, so as to prevent such deflection and the creep strain of the film sheath 4 as shown in FIG. 25. Since the maximum width D2 of the arms 30a and 30b is 13.5 mm in the above embodiment, the plate spring 30 would remarkably reduce the deflection of the film sheath 4 without the narrower intermediate portions 31 and 32 or the ridges 35 and 36. However, the narrower intermediate portions 31 and 32 ensure the arms 30a and 30b contacting the film sheath 4 at positions within 15 mm from the side edges 4c and 4d.

Table 2 shows the results of experiments on the degree of deflection of the film sheath 4 and formability of the plate spring 30 in relation to the width D7 of the intermediate portions 31 and 32, i.e. that of the peaks 31a and 32a of the arms 30a and 30b.

TABLE 2

| WIDTH D7 | DEFLECTION | FORMABILITY |
| --- | --- | --- |
| 1 mm | A | E |
| 2 mm | A | D |
| 3 mm | A | C |
| 5 mm | B | B |
| 10 mm | B | B |
| 15 mm | C | B |
| 20 mm | D | A |
| 25 mm | E | A |

As shown in Table 2, the width D7 of the arms 30a and 30b at the peaks 31a and 32a should not be more than 15 mm in view of the deflection of the film sheath 4, but should not be less than 3 mm in view of formability of the plate spring 30. Therefore, the width D7 is preferably 3 mm to 15 mm. Since the width D7 is 8 mm in the above described embodiment, the plate spring 30 can be easy to mold, but can hardly cause the deflection or creep strain in the film sheath 4.

As described above, the ridges 35 and 36 are formed by deep drawing a metal spring plate. But the facility of deep drawing varies depending upon the width D10 of the ridges 35 and 36. Table 3 shows the results of experiments on the facility of deep drawing in relation to the width D10.

TABLE 3

| WIDTH D10 | DEEP DRAWING FACILITY |
| --- | --- |
| 0.3 mm | E |
| 0.5 mm | D |
| 1.0 mm | C |
| 1.5 mm | B |
| 2.0 mm | B |
| 3.0 mm | A |
| 5.0 mm | A |

Table 3 shows that the width D10 of the ridges 35 and 36 should be 1.0 mm or more. Since the width D10 is 1.5 mm in the above described embodiment, the ridges 35 and 36 are suitable for deep draw forming.

The length D9 of the ridges 35 and 36 may be equal to the entire length D1 of the arms 30a and 30b, but it was found preferable to provide the ridges 35 and 36 within a range of ±20 mm around the peaks 31a and 32a, for preventing deflection of the film sheath 4, while ensuring good moldability of the ridges 35 and 36 and suitable resilience of the plate spring 30. Therefore, the length D9 of the ridges 35 and 36 is determined to be 36 mm in the present embodiment. It was also proved that a preferable range of the height H1 of the ridges 35 and 36 is from 0.1 mm to 1.0 mm, in view of prevention against the deflection of the film sheath 4, moldability of the ridges 35 and 36, and resilience of the plate spring 30. Therefore, the height H1 of the ridges 35 and 36 is determined to be 0.5 mm in the present embodiment.

Figure 7A:
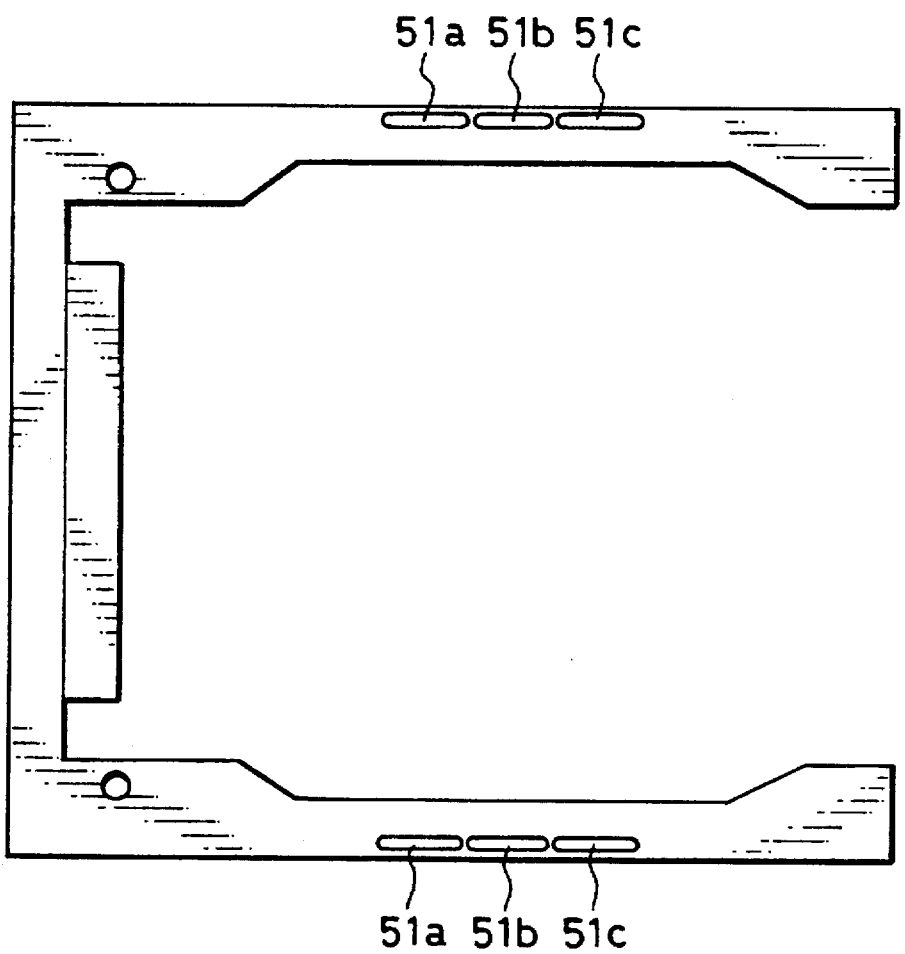
FIG. 7A is a top plan view illustrating a variation of protrusions formed along the lengths of the arms.
Figure 7B:
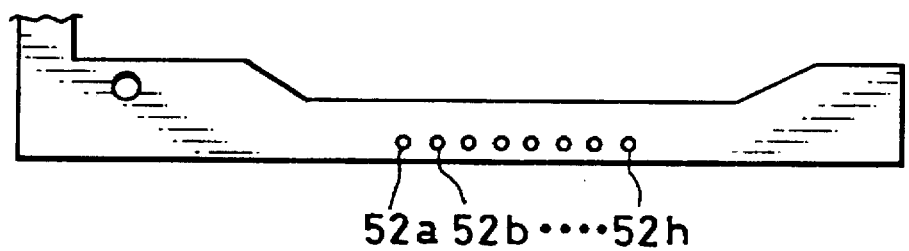
FIGS. 7B and 7C are fragmentary top plan views illustrating further variations of protrusions formed along the lengths of the arms.
Figure 7C:
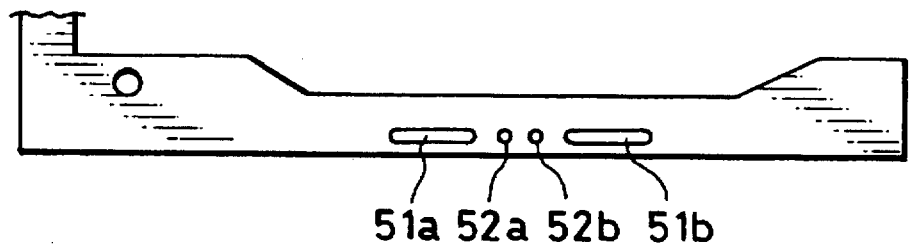

The present invention should not be limited to the above-described embodiment. For example, each of the ridges 35 and 36 may be replaced by a plurality of, e.g., three shorter ridges 51a, 51b and 51c aligned in a line, as shown in FIG. 7A, or by a plurality of, e.g., eight bosses aligned in a line, as shown in FIG. 7B. It is also possible to combine these shorter ridges 51a and 51b and bosses 52a and 52b, as shown in FIG. 7C.

Also the ridges 35 and 36 may have another sectional contour than the trapezoidal section shown in FIG. 3. For example, as shown in FIGS. 8A to 8D, it is possible to form a ridge 35a, 35b, 35c or 35d having an arched, triangular, rectangular, or polygonal sectional contour, respectively. It is also possible to cement separate parts onto the plate spring to provide ridges.

Figure 9:
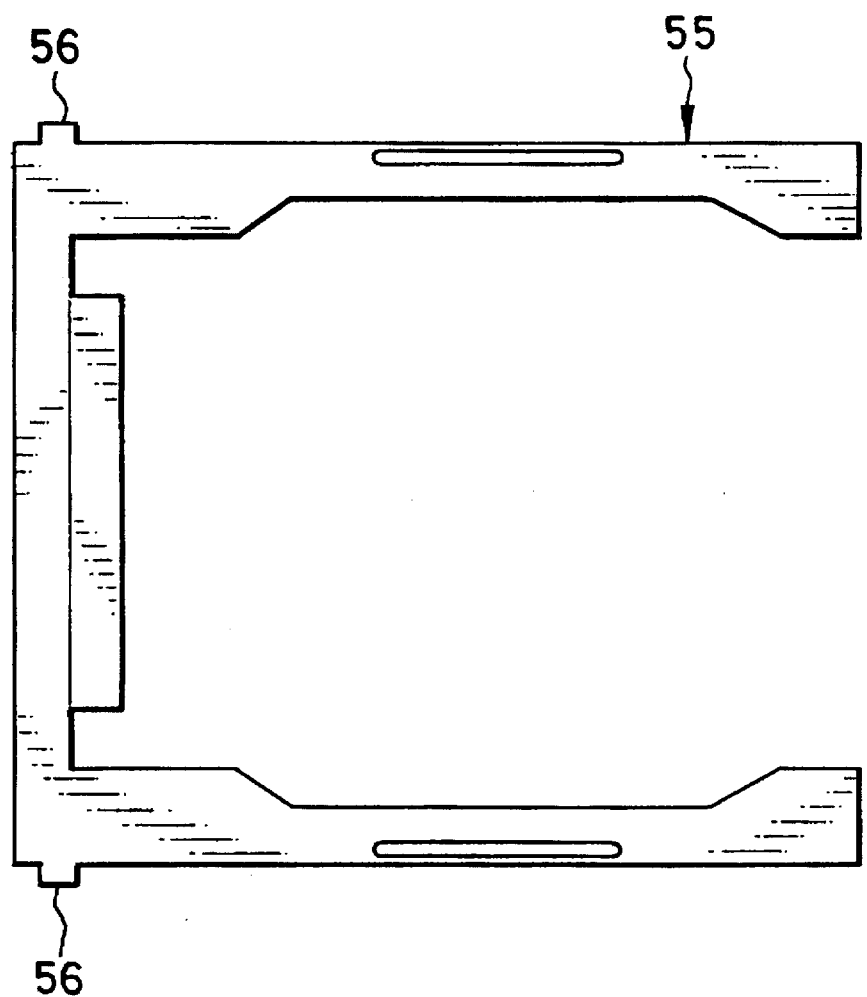
FIG. 9 is a top plan view illustrating a plate spring having lugs as securing members according to another embodiment of the invention.
Figure 10:
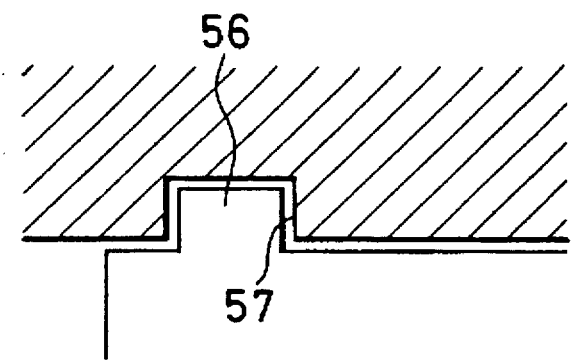
FIG. 10 is a fragmentary sectional view illustrating the engagement between the lug of the spring plate and a hole of the pack housing.
Figure 21:
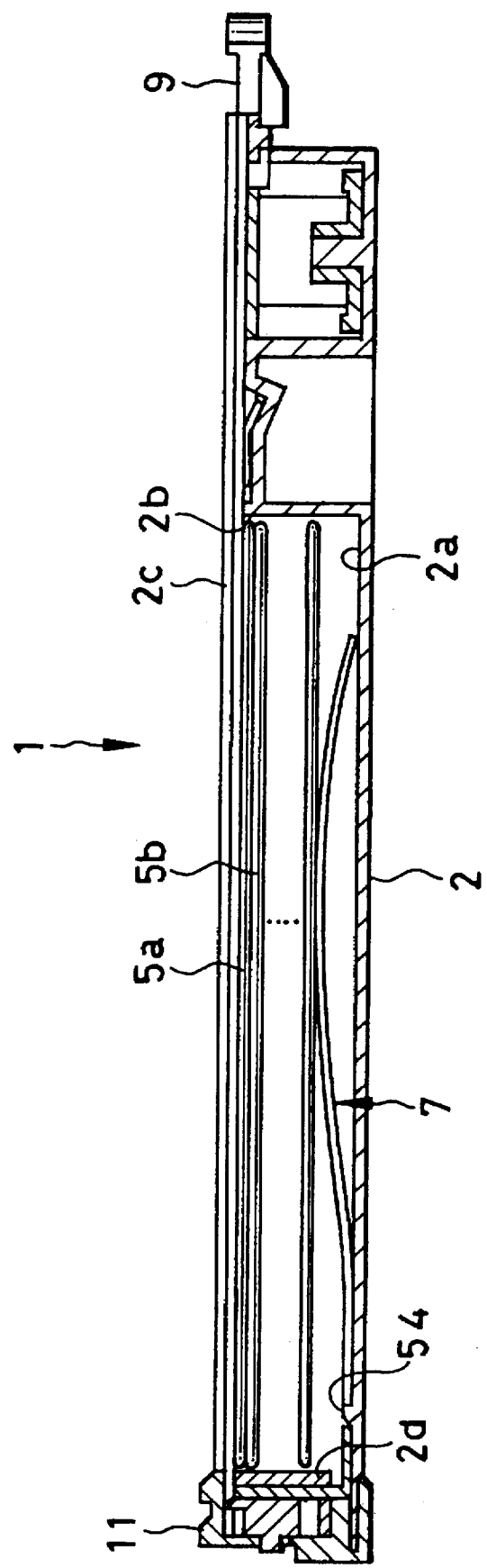
FIG. 21 is a sectional view of the sheet film pack.
Figure 22:
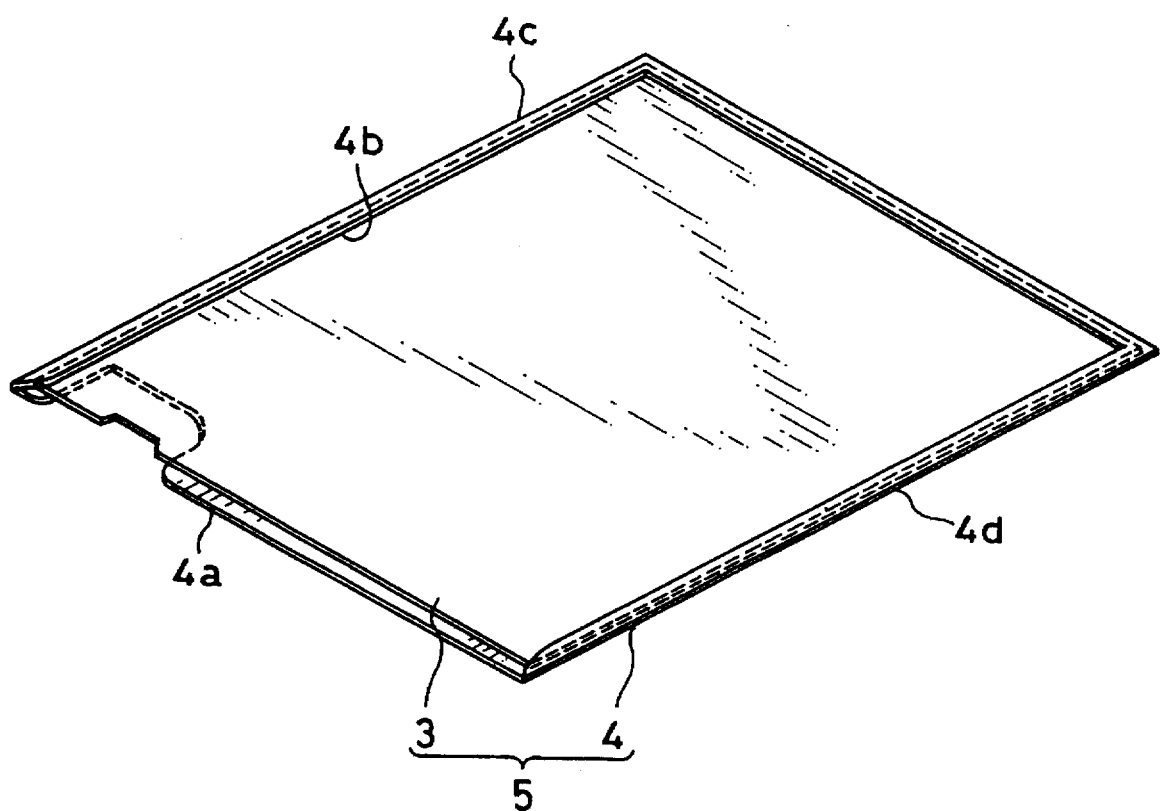
FIG. 22 is a perspective view of a sheet film unit contained in the sheet film pack.
Figure 23:
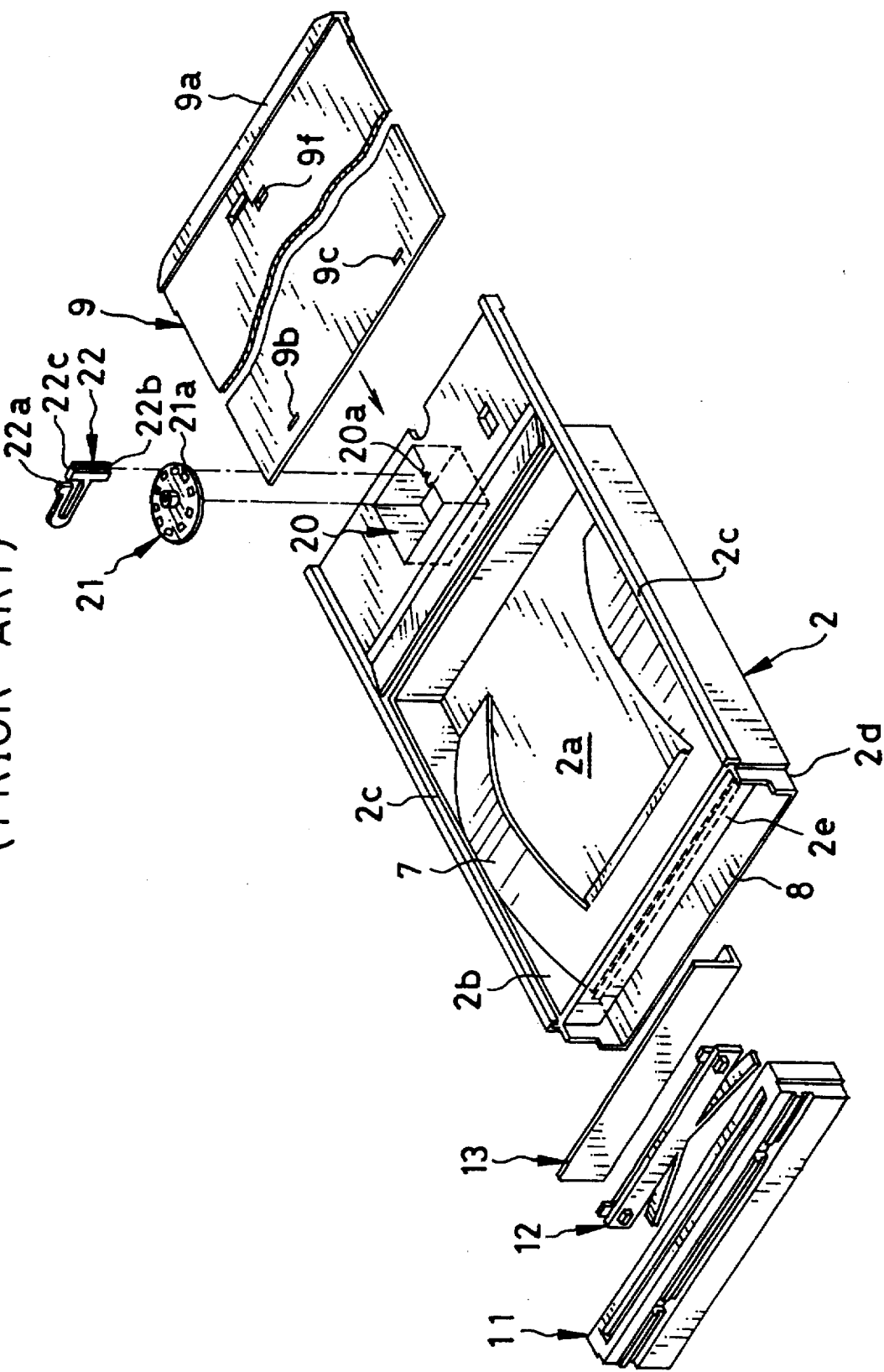
FIG. 23 is an exploded perspective view of the sheet film pack excluding the sheet film unit.
Figure 24:
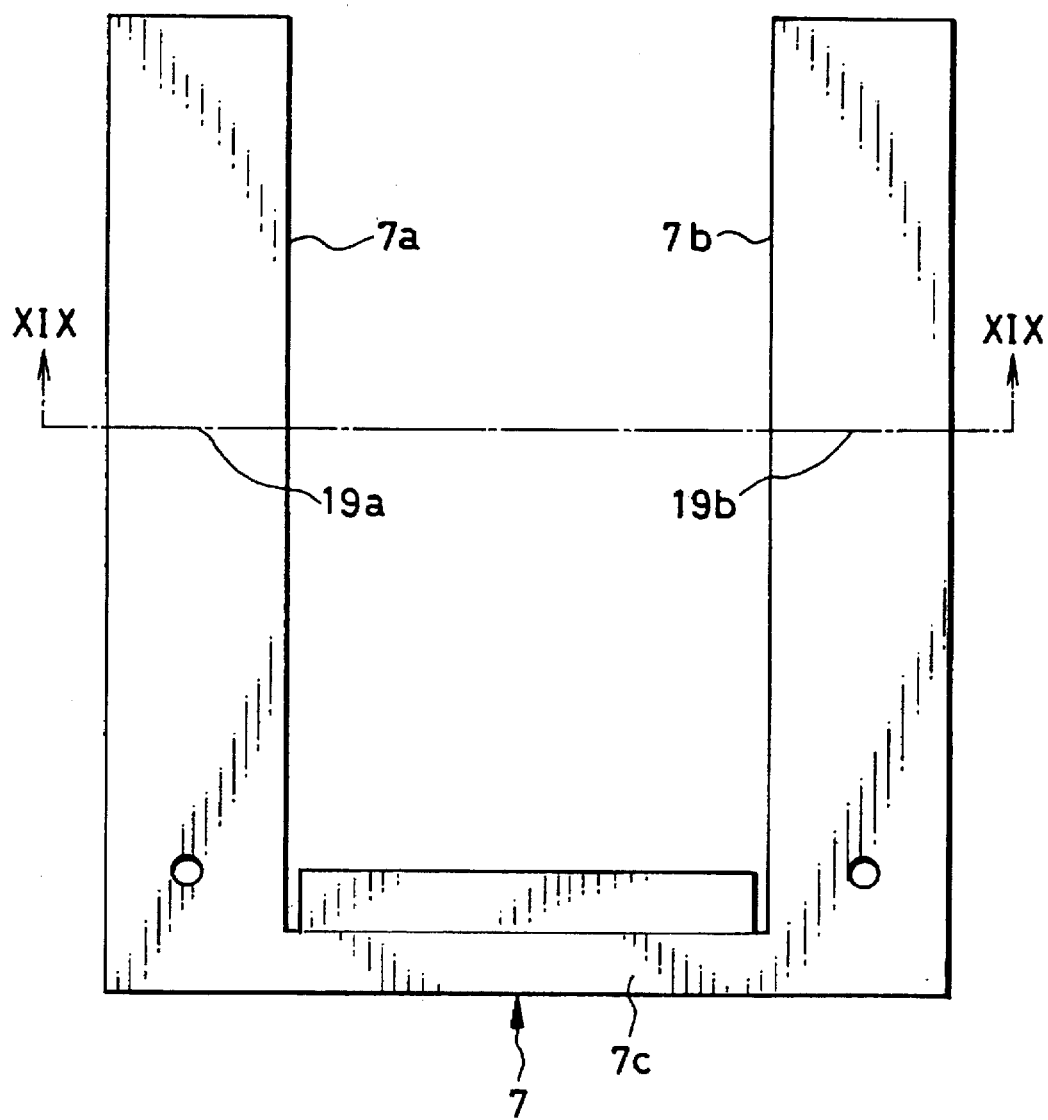
FIG. 24 is a top plan view of a plate spring used in the prior art sheet film pack.

Although the plate spring 30 is secured to the bottom surface 2a of the pack housing 2 by caulking in the above embodiment, the plate spring 30 may be secured to the bottom surface 2a in the same way as the prior art shown in FIG. 21, that is, by contacting the outer end 30f of the base portion 30c against a lateral ridge 54 formed on the bottom surface 2a. It is also possible to form lugs 56 integrally with a plate spring 55, which protrude laterally outwardly from opposite sides of the base portion 30c, as shown in FIG. 9. In that case, recesses 57 are formed in inner side walls of a pack housing 2 so as to accept the lugs 56, as shown in FIG. 10. Alternatively, the plate spring may have recesses in the lateral sides, whereas corresponding projections are formed on the inner side walls of the pack housing.

Figure 11:
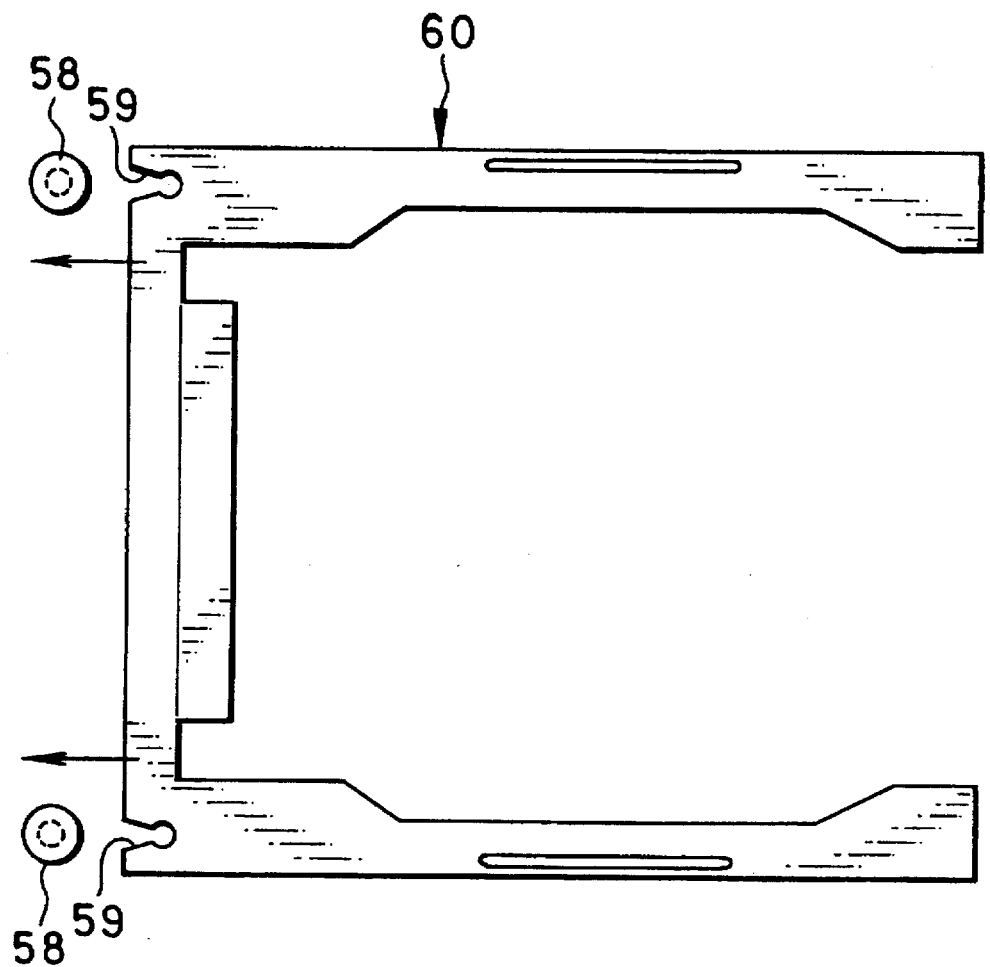
FIG. 11 is a top plan view illustrating a plate spring having slits as securing members of the plate spring which are force-fitted to button members formed on a pack housing.
Figure 12:
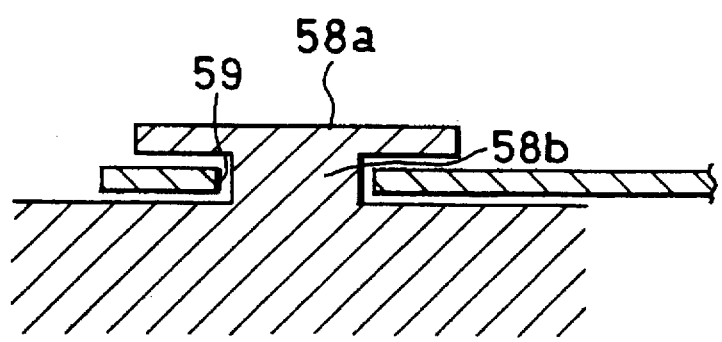
FIG. 12 is a fragmentary sectional view illustrating the engagement between the slit and the button member.

According to another embodiment shown in FIGS. 11 and 12, a pair of button members 58 are formed integrally on a bottom surface 2a of a pack housing 2. The protrusion 58 has a flat top 58a and a stem 58b with a smaller diameter. Corresponding to the protrusions 58, a pair of cut-outs 59 are formed in a plate spring 60, so that the cut-outs 59 are force-fitted onto the stems 58b of the button members 58 by sliding the plate spring 60 in a direction shown by arrows in FIG. 11.

Figure 13:
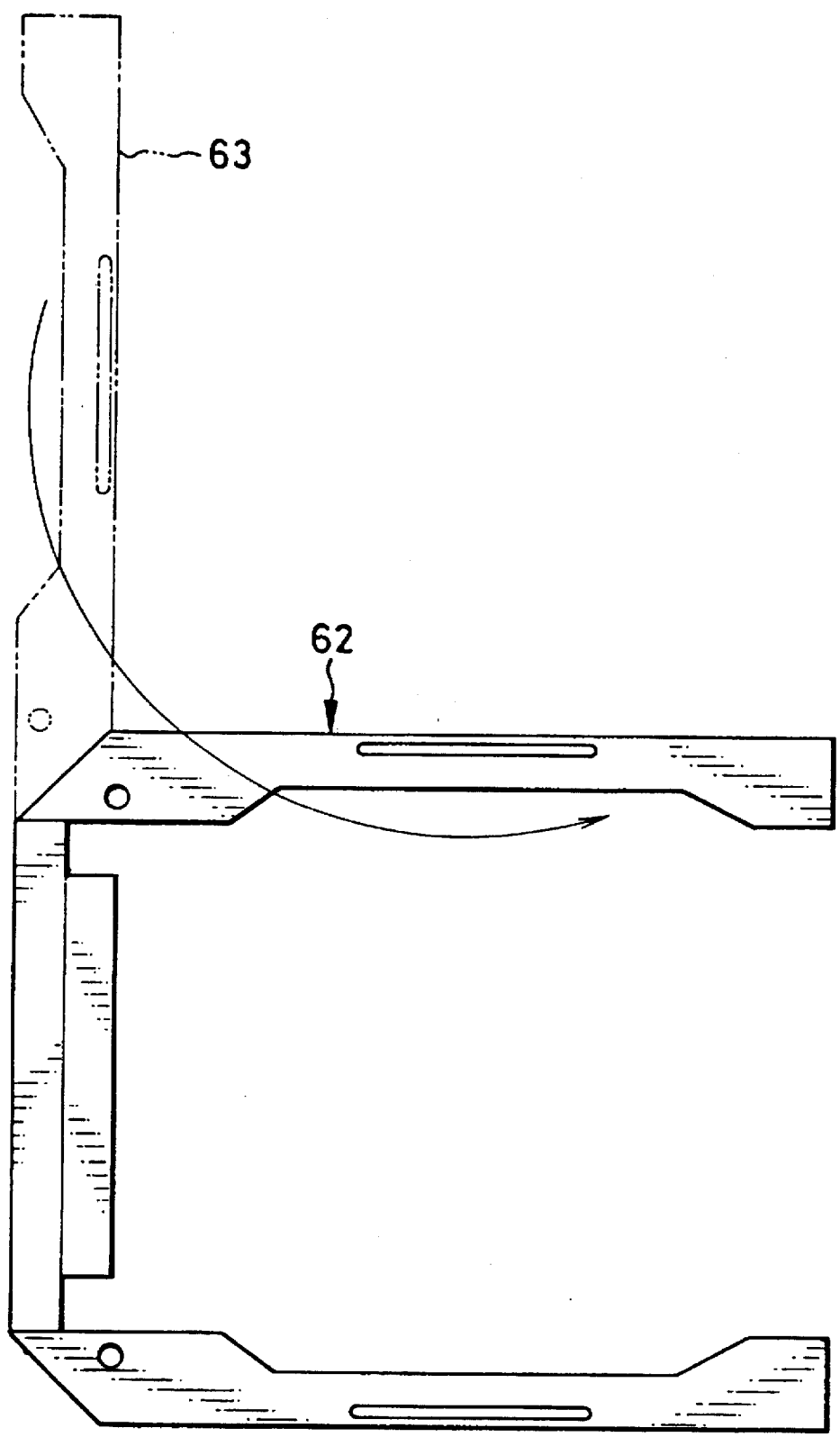
FIG. 13 is an explanatory view illustrating a manufacturing method of a plate spring according to an embodiment of the invention.

Although the plate spring 30 is formed by blanking out a metal spring plate into the complete shape in the above embodiments, it is possible to form a plate spring 62 by folding a linear metal strip 63, which is blanked out from a metal spring plate, into the predetermined shape as shown by phantom lines in FIG. 13.

Figure 14:
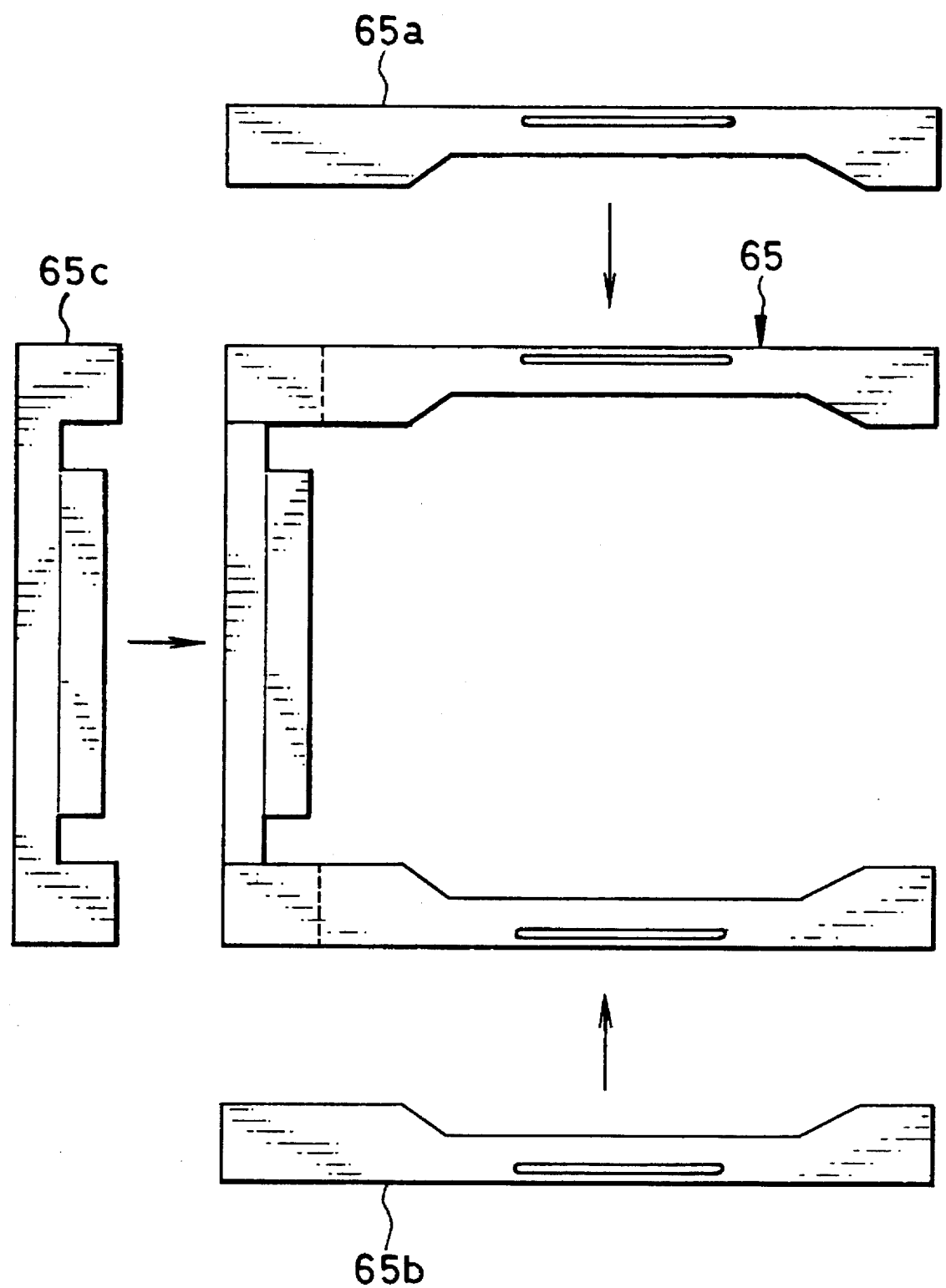
FIG. 14 is an explanatory view illustrating a manufacturing method of a plate spring according to another embodiment of the invention.

Furthermore, it is possible to form a plate spring 65 by connecting separate arm members 65a and 65b through a base member 65c, as is shown in FIG. 14. In this embodiment, the arm members 65a and 65b are preferably made of metal spring plates, while the base member 65c may be a metal plate or a plastic plate. For joining these members 65a to 65c, welding or bonding is applicable. When the base member 65c is a plastic plate, it is preferable to provide the base member 65c with grooves or the like for accepting ends of the arm members 65a and 65b, so as to ensure the joints.

It is to be noted that the above mentioned stainless steel "SUS 340 CSP" is suitable for the material of the plate spring, because it hardly rusts without any surface treatment, does not adversely affect the photosensitivity of the sheet film 3, and is inexpensive. However, any other conventional elastic materials suitable for a spring, such as beryllium steel, phosphor bronze, engineering plastics and so forth, are applicable. Of course, the plate spring may be taken surface treatment such as rust preventing treatment, antistatic treatment, metal-deposit treatment, and so forth.

Figure 15:
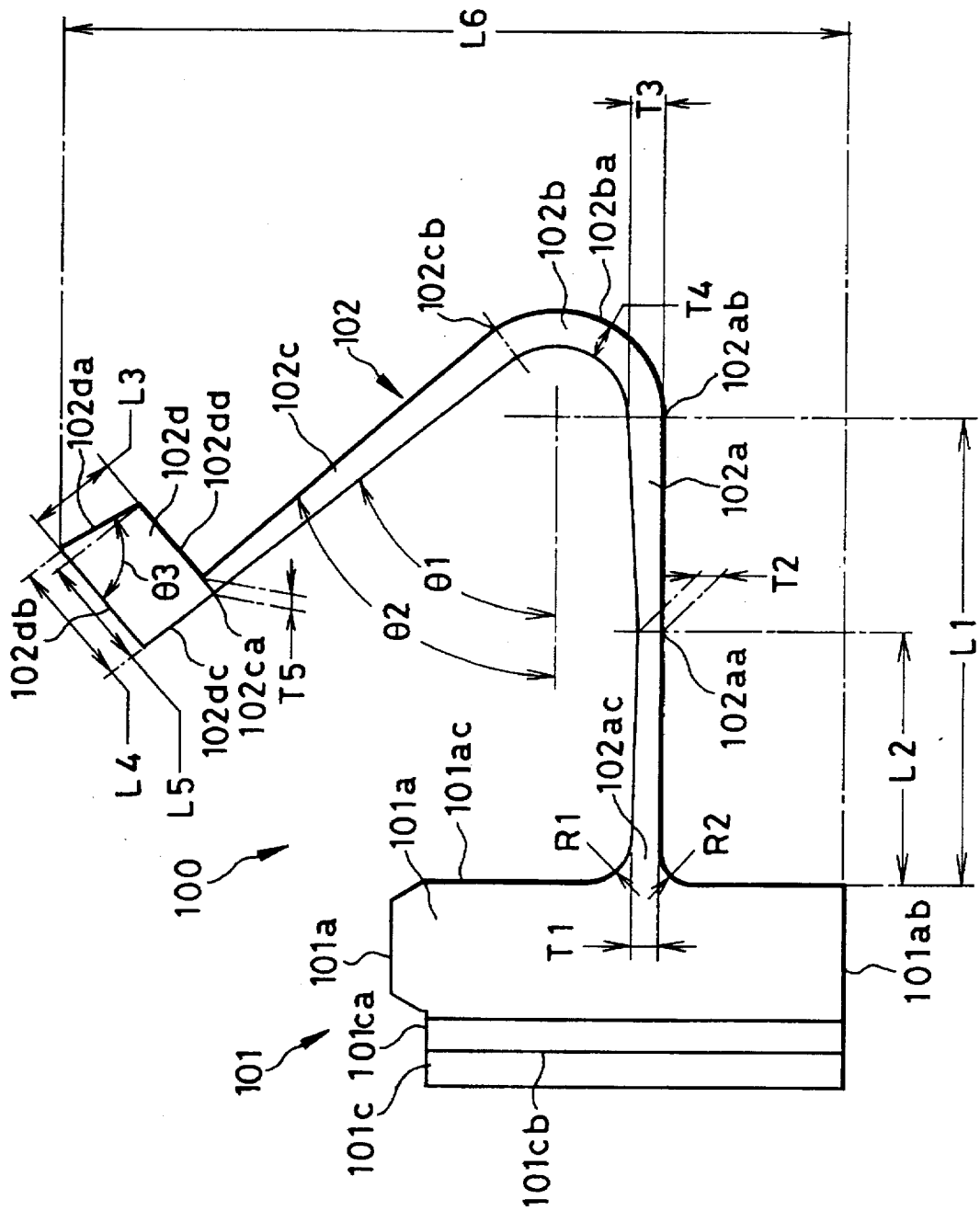
FIG. 15 is a side view of a pressing member for pressing a counter disc of the sheet film pack, according to a preferred embodiment of the invention.

Referring now to FIG. 15 showing a pressing member 100 for use with a counter disc 21, the pressing member 100 according to the invention is improved in creep-resistance, as will be described below. The pressing member 100 fundamentally consists of a stem portion 101 and a spring arm 102 like the conventional pressing member 22. The stem portion 101 has a box-shaped stem base 101a and a guide portion 101c. A top surface 101aa of the stem base 101a is higher than an upper end 101ca of the guide portion 101c. Grooves 101cb are formed on opposite surfaces of the guide portion 101c, which are engaged in a vertical rail 20a of a cavity 20 of the pack housing 2, to guide the pressing member 100 down into the cavity 20.

The spring arm 102 extends from a middle portion of a vertical side 101ac of the stem base 101a opposite from the guide portion 101c, substantially perpendicularly to the vertical side 101ac. Hereinafter, a portion 102a of the spring arm 102 that extends substantially horizontal will be referred to as a horizontal arm portion 102a. The horizontal arm portion 102a is connected to a fore arm portion 102c through a curved portion 102b. According to the present invention, the fore arm portion 102c does not extend horizontally, but obliquely to the horizontal arm portion 102a. A box-shaped distal end portion 102d is formed in the distal end of the spring arm 102, such that an outer end surface 102da of the distal end portion 102d is put in contact with the inner surface of the sliding lid 9 to constrain or compress the pressing member 100 in the cavity 20.

In the constrained position, a bottom surface 101ab of the stem portion 101 is pressed against one of a plurality of anti-reversal claws 21a of the counter disc 21. If the pressing power of the pressing member 100 is too small, the counter disc 21 cannot stop properly, then it would be difficult to read indicia on the counter disc 21. If, on the other hand, the pressing power is too large, it would be difficult to smoothly advance the counter disc 21 by an external counter advancing mechanism. For applying an appropriate pressing power onto the counter disc 21, the pressing member 100 should preferably have a reactive force of 20 g to 100 g, and most preferably 50 g, when the pressing member 100 is compressed 7.7 mm in the vertical direction. It is to be noted that the pressing member 100 is assumed to be compressed vertically by 7.7 mm by the sliding lid 9 when a predetermined number of sheet film units 5 are contained in the pack housing 2.

The present invention determines the angle of the fore arm portion 102c relative to the horizontal direction so that the pressing member 100 may have a reactive force in that range when compressed vertically by 7.7 mm. Preferably, the inner surface of the fore arm portion 102c forms an angle $\theta1$ of 32° to 72° relative to the horizontal direction, and the outer surface of the fore arm portion 102c forms an angle $\theta2$ of 30° to 70° relative to the horizontal direction. The most preferable angles $\theta1$ and $\theta2$ are 52° and 50°, respectively.

The distal end portion 102d is not a rectangular prism, but the outer end surface 102da and an adjacent end surface 102db form an angle $\theta3$ of 83°, so that the outer end surface 102da may tightly contact the inner surface of the sliding lid 9, while the pressing member 100 is constrained by the sliding lid 9 and thus compressed vertically 7.7 mm. The angle $\theta3$ may preferably be in a range from 73° to 93°, but most preferably 83°.

According to a preferred embodiment, a root 102ac of the spring arm 102 where the spring arm 102 is connected to the stem portion 101, has a thickness T1 of 0.9 mm. The thickness decreases from the root 102ac toward a middle position 102aa of the horizontal arm portion 102a, so that the middle position 102aa has a thickness T2 of 0.6 mm. From the middle position 102aa, the thickness increases toward the curved portion 102b. As a result, a thickness T3 of a connecting position 102ab between the horizontal arm portion 102a and the curved portion 102b is 1.0 mm. It is to be noted that "thickness" here means a distance from a point of the outer surface of the spring arm 102 to a second point of the inner surface that is disposed in the same normal line to the outer surface as the first point.

Of the horizontal arm portion 102a, a length L1 from the vertical side 101ac of the stem portion 101 to the connecting position 102ab is 14.5 mm, whereas a length L2 from the vertical side 101ac of the stem portion 101 to the middle position 102aa is 7.75 mm. Upper and lower borders between the root 102ac of the spring arm 102 and the stem portion 101 is rounded with radii R1 and R2 of curvature of 1.5 mm and 1 mm, respectively.

The curved portion 102b has a thickness T4 of 1 mm throughout the length, i.e., from the connecting position 102ab to another connecting position 102cb connected to the fore arm portion 102c. The inner and outer surfaces of the spring arm 102 in the curved portion 102b have radii of curvature of 2.2 mm and 3.2 mm, respectively, relative to a common center point which is disposed 14.5 mm distant from the vertical side 101ac in the horizontal direction, and 8.8 mm from the bottom surface 101ab of the stem portion 101 in the vertical direction.

The thickness of the fore arm portion 102c decreases from the connecting position 102cb of 1.0 mm thick toward a distal connecting position 102ca having a thickness T5 of 0.6 mm, where the fore arm portion 102c is connected to the distal end portion 102d. The angle $\theta1$ of the inner surface of the fore arm portion 102c is 52° relative to the horizontal direction, whereas the angle $\theta2$ of the outer surface of the fore arm portion 102c is 50° relative to the horizontal direction.

The angle $\theta3$ of the outer end surface 102da to the adjacent end surface 102db is 83°. A length L3 from the end surface 102db to the opposite side 102dd of the distal end portion 102d is 2.8 mm. The end surface 102db has a length L4 of 3.8 mm in a direction from the outer end surface 102da to an inner end surface 102dc of the distal end portion 102d, while a length or distance L5 from the outer end surface 102da to the inner end surface 102dc is 3.6 mm in the opposite side 102dd to the end surface 102db. A vertical length or height L6 from the bottom surface 101ab of the stem portion 101 to an upper tip of the distal end portion 102d is 24.1 mm.

Figure 16:
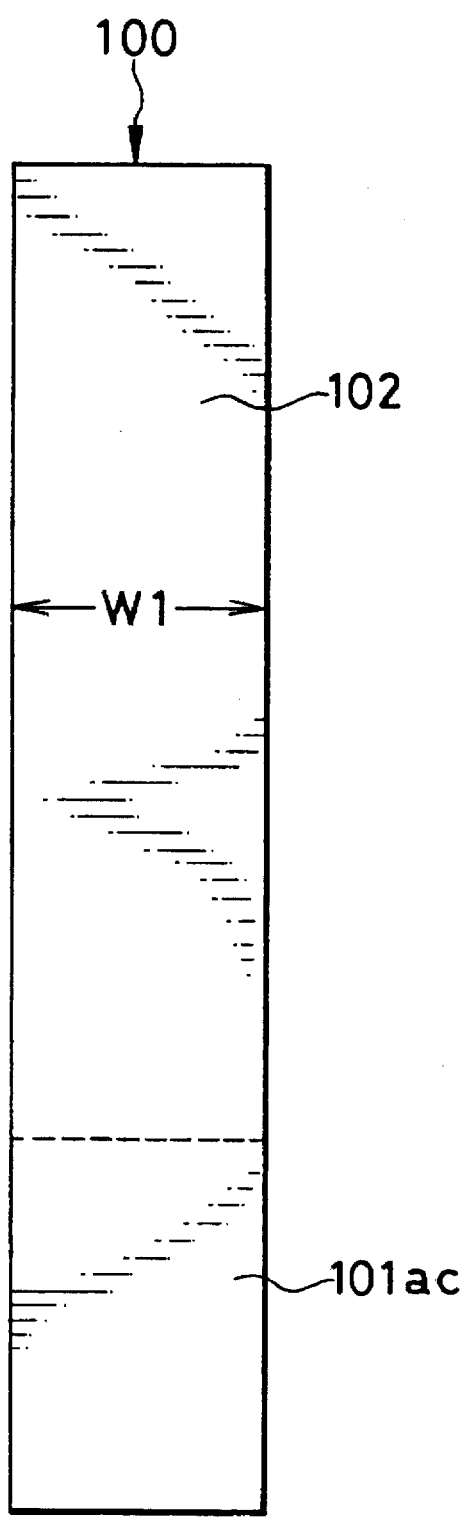
FIG. 16 is a front view of the pressing member viewed from a spring arm thereof.
Figure 20:
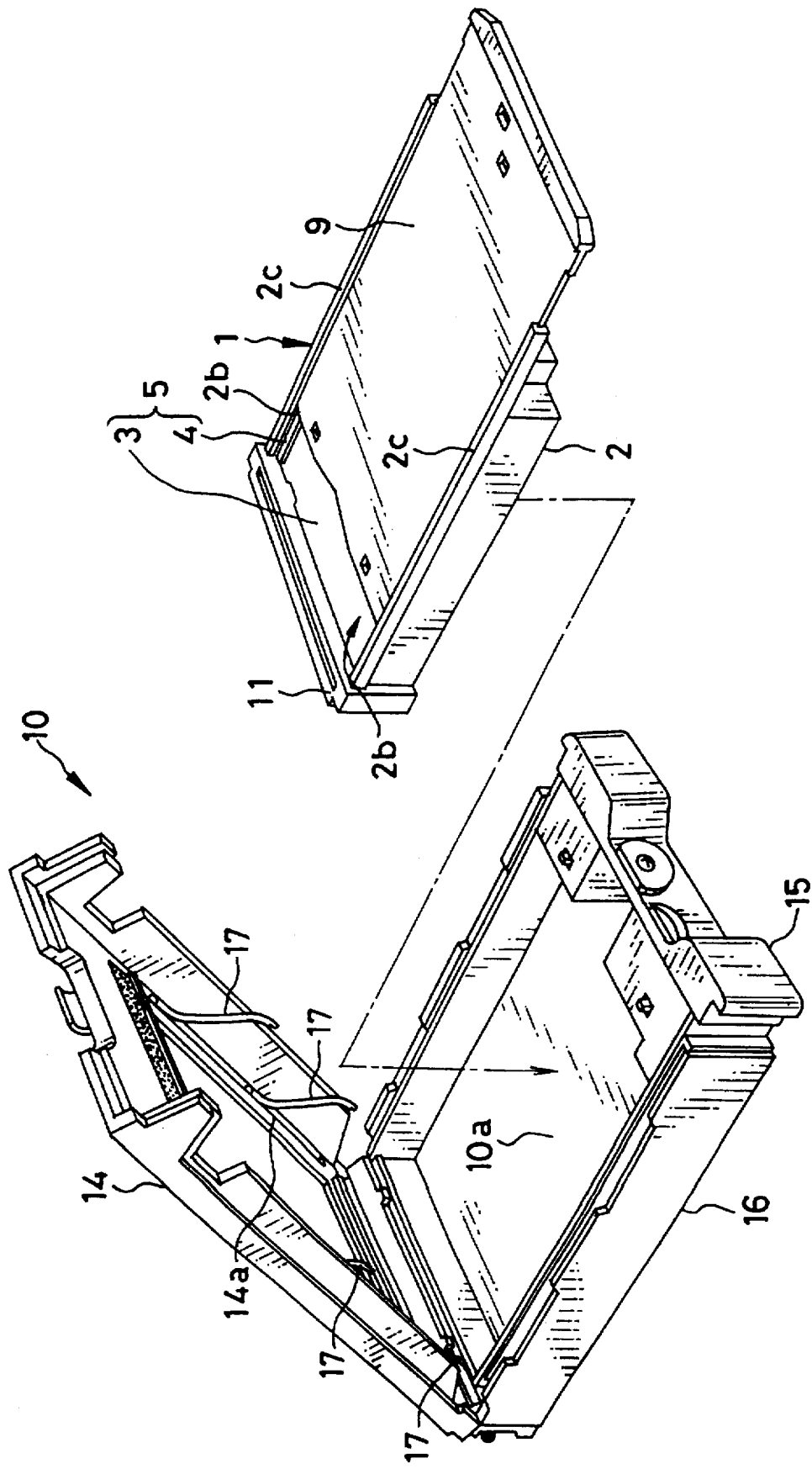
FIG. 20 is an exploded perspective view of a sheet film pack and a pack holder for holding the sheet film pack according a prior art.

FIG. 16 schematically shows the pressing member 100 viewed from the front of the spring arm 102. As shown, the spring arm 102 has a constant width W1 of 2 mm throughout the entire length.

The pressing member 100 is formed as an integral body by resin injection molding. As for the resin, any material is applicable if only it is superior in lightweight properties and workability, and is able to prevent creep strain of the spring arm 102 for a sufficiently long time. Preferred are polyurethane resin, polyester resin, acrylic resin, polyacetal resin, polyphenylene oxide resin, etc., of which polyacetal resin is the most preferable. It is preferable to form the pressing member 100 from polyacetal resin by use of an in-line screw type injection molding device, at a clamp pressure of 75 t, in a molding cycle of 18 seconds, with a resin temperature of 215° and a mold temperature of 80°. However, these conditions are not limitative.

Polyacetal resin generally contains formaldehyde. It is well known that high density formaldehyde has a bad effect on photosensitivity. That is, it would deteriorate the photosensitive emulsion layer of the sheet film. Therefore, in case of the pressing member 100 being formed from polyacetal resin, the density of formaldehyde emerging from the pressing member 100 must be 30 ppm or less, and more preferably 20 ppm or less in the interior of the pack housing 2.

The pressing member 100 formed from polyacetal resin preferably has physical properties as shown in FIG. 17, through they are variable so far as an appropriate reactive force and a sufficient creep-resistance can be obtained in the pressing member 100.

The pressing arm 102 of the pressing member 100 configured as above and formed from polyacetal resin has a reactive force of 50 g when the distal end portion 102d is depressed to compress the vertical length L6 by 7.7 mm. FIG. 18 shows the values of stress at different portions or positions of the spring arm 102 when it is depressed or compressed in that way. The stress values are calculated according to the finite element method after modeling the configurations of the pressing member 100 by use of a general purpose analyser program software.

As shown in FIG. 18, the stress at a middle position 102ba of the curved portion 102b is 147 kgf/cm² (14.4 MPa), that is the largest of all portions of the spring arm 102. However, the smallest stress at the middle position 102aa of the horizontal arm portion 102a is 0.7 kgf/cm² (0.07 MPa), and the difference between the largest and the smallest stress values is 146.3 kgf/cm² (14.4 MPa).

As comparative data, FIG. 19 shows stress values at the corresponding positions of a spring arm of a pressing member which has almost the same configurations as the pressing member 100, except that the thickness as well as the width of its spring arm is constant. The comparative pressing member was formed from polyacetal resin so as to have a reactive force of 50 g when its distal end portion 102d is depressed to compress the comparative pressing member vertically by 7.7 mm. The stress values are calculated according to the finite element method after modeling the configurations of the comparative pressing member by use of the general purpose analyser program software.

As shown in FIG. 19, in the comparative pressing arm, the largest stress at the middle position 102ba of the curved portion 102b is 185 kgf/cm² (18.1 MPa), whereas the smallest stress at the middle position 102aa of the horizontal arm portion 102a is 4 kgf/cm² (0.39 MPa). Accordingly, the difference between the largest and the smallest stress values is 181 kgf/cm² (17.8 MPa).

Consequently, in the spring arm 102 of the present invention, the maximum difference in stress between the respective portions is small, and also the largest stress in the curved portion 102b is remarkably, i.e., about 20% reduced, compared with the comparative pressing arm.

In conclusion, as a result of making the root 102ac and the curved portion 102b of the spring arm 102 thicker than the middle position 102aa of the horizontal arm portion 102a and the distal connecting position 102ca of the fore arm portion 102c, the stress under compression of the spring arm 102 is dispersed toward the distal connecting position 102ca of the fore arm portion 102c, thereby reducing the stress concentration on the curved portion 102b. Thus, creep-strain of the spring arm 102 is minimized or prevented.

To prevent the stress concentration on the curved portion 102b, it is possible to change the width of the spring arm 102 instead of the thickness thereof. In other words, stress distribution depends upon the cross-sectional areas of the respective portions of the spring arm. For example, by making the root 102ac and the curved portion 102b of the spring arm 102 wider than the middle position 102aa of the horizontal arm portion 102a and the distal connecting position 102ca of the fore arm portion 102c, the compression stress is dispersed toward the distal connecting position 102ca of the fore arm portion 102c, so that the same effect as above is achieved.

Although the present invention has been described in detail with respect to the preferred embodiments shown in the drawings, the present invention is not to be limited to those embodiments.

For example, the pressing member 100 may be constrained by a cover plate put on the open top of the cavity 20, instead of the sliding lid.

The plate spring or the pressing member according to the present invention is not only useful in other type sheet film pack, but also applicable to other devices that use an elastic member.

Thus, various modifications may be possible to those skilled in the art without departing from the scope of the appended claims.

What is claimed is:

1. An elastic device comprising:

a stem portion; and a spring arm extending from a vertical side of said stem portion and having a horizontal arm portion, a curved portion, a fore arm portion, and a free distal end, said spring arm having a greater cross-sectional area in the curved portion and proximate to the stem portion as compared to the middle of the horizontal arm portion and the distal end of the fore arm portion, so as to reduce the stress differential between the different portions of said spring arm under a compressed condition.

2. An elastic device as recited in claim 1, wherein said curved portion has a thickness which is greater than the thickness of other portions of said spring arm.

3. An elastic device comprising:

a stem portion; and a spring arm extending from a vertical side of said stem portion and having a curved portion and a free distal end, said spring arm having different cross-sectional areas in different portions thereof so as to reduce the stress differential between the different portions of said spring arm under a compressed condition;

wherein the cross-sectional area of said spring arm is the largest at a root of said spring arm connected to said stem portion and in said curved portion, and the smallest at a middle position between said root and said curved portion, and the cross-sectional area decreases from said curved portion toward said distal end of said spring arm, and a portion of said spring arm that extends from said root to said curved portion is substantially perpendicular to said vertical side of said stem portion.

4. An elastic device as recited in claim 3, wherein said stem portion and said spring arm are formed as one body from polyacental resin.

* * * * *